(12) United States Patent
Manolakos et al.

(10) Patent No.: US 12,368,552 B2
(45) Date of Patent: *Jul. 22, 2025

(54) FAST ADAPTATION OF TRANSMISSION PROPERTIES OF SRS RESOURCE SETS

(71) Applicant: QUALCOMM Incorporated, San Diego, CA (US)

(72) Inventors: Alexandros Manolakos, Escondido, CA (US); Weimin Duan, San Diego, CA (US); Muhammad Sayed Khairy Abdelghaffar, San Jose, CA (US); Pavan Kumar Vitthaladevuni, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 18/173,265

(22) Filed: Feb. 23, 2023

(65) Prior Publication Data
US 2023/0239095 A1 Jul. 27, 2023

Related U.S. Application Data

(63) Continuation of application No. 17/024,118, filed on Sep. 17, 2020, now Pat. No. 11,601,242.

(30) Foreign Application Priority Data

Oct. 3, 2019 (GR) .............................. 20190100430

(51) Int. Cl.
*H04L 5/00* (2006.01)
*H04W 72/23* (2023.01)

(52) U.S. Cl.
CPC ........... *H04L 5/0048* (2013.01); *H04W 72/23* (2023.01)

(58) Field of Classification Search
CPC ............................ H04L 5/0048; H04W 72/23
See application file for complete search history.

(56) References Cited

U.S. PATENT DOCUMENTS

| 8,837,394 B2 | 9/2014 | Lin et al. |
| 10,841,059 B2 | 11/2020 | Park et al. |
| (Continued) | | |

FOREIGN PATENT DOCUMENTS

WO    2019159024 A1    8/2019

OTHER PUBLICATIONS

International Preliminary Report on Patentability—PCT/US2020/051611, the International Bureau of WIPO—Geneva, Switzerland, Apr. 14, 2022.

(Continued)

*Primary Examiner* — Ronald B Abelson
(74) *Attorney, Agent, or Firm* — Patterson + Sheridan, L.L.P.

(57) ABSTRACT

Certain aspects of the present disclosure provide techniques for fast adaptation of transmission properties of sounding reference signal (SRS) resource sets. A method that may be performed by a user equipment (UE) includes receiving sounding reference signal (SRS) configuration information, configuring the UE with one or more SRS resource sets, wherein each of the one or more SRS resource sets comprises one or more SRS resources; receiving signaling comprising a field indicating which of the one or more SRS resources in the one or more SRS resource sets are active and which of the one or more SRS resources in the one or more SRS resources sets are inactive; and transmitting one or more SRSs using only the one or more SRS resources that are active.

24 Claims, 11 Drawing Sheets

(56) References Cited

U.S. PATENT DOCUMENTS

| | | | |
|---|---|---|---|
| 2006/0036894 A1 | 2/2006 | Bauer et al. | |
| 2013/0315192 A1 | 11/2013 | Seo | |
| 2019/0109679 A1* | 4/2019 | Liu | H04B 7/0417 |
| 2019/0174466 A1 | 6/2019 | Zhang et al. | |
| 2019/0190582 A1 | 6/2019 | Guo et al. | |
| 2019/0190669 A1 | 6/2019 | Park et al. | |
| 2019/0280835 A1* | 9/2019 | Määttänen | H04L 5/0053 |
| 2019/0281588 A1 | 9/2019 | Zhang et al. | |
| 2019/0297603 A1* | 9/2019 | Guo | H04B 7/0695 |
| 2019/0349964 A1 | 11/2019 | Liou | |
| 2020/0106168 A1 | 4/2020 | Hakola et al. | |
| 2020/0413416 A1 | 12/2020 | Jiang et al. | |
| 2021/0105116 A1 | 4/2021 | Manolakos et al. | |
| 2021/0377876 A1* | 12/2021 | Jeon | H04W 24/08 |

OTHER PUBLICATIONS

International Search Report and Written Opinion—PCT/US2020/051611—ISA/EPO—Dec. 14, 2020.
Sony: "Remaining Issues on SRS", 3GPP Draft; R1-1804594—Remaining Isseus on SRS-0.1, 3rd Generation Partnership Project (3GPP), Mobile Competence Centre; 650, Route Des Lucioles; F-06921 Sophia-Antipolis Cedex; France vol. RAN WG1, No. Sanya, China; Apr. 16, 2018-Apr. 20, 2018, Apr. 15, 2018 (Apr. 15, 2018), 3 Pages, XP051426863, Section 2.1.

* cited by examiner

```
SRS-ResourceSet ::=            SEQUENCE {
    srs-ResourceSetId          SRS-ResourceSetId
    srs-ResourceIdList         SEQUENCE (SIZE(1..maxNrofSRS-ResourcesPerSet)) OF
SRS-ResourceId                 OPTIONAL, -- Cond Setup
    resourceType               CHOICE {
        aperiodic              SEQUENCE {
            aperiodicSRS-ResourceTrigger    INTEGER (1..maxNrofSRS-TriggerStates-1),
            csi-RS                          NZP-CSI-RS-ResourceId
OPTIONAL, -- Cond NonCodebook
            slotOffset                      INTEGER (1..32)
OPTIONAL, -- Need S
            [[
            aperiodicSRS-ResourceTriggerList-v1530   SEQUENCE (SIZE (1..maxNrofSRS-
TriggerStates-2))
                                                     OF INTEGER (1..maxNrofSRS-
TriggerStates-1)   OPTIONAL -- Need M
            ]]
        },
        semi-persistent        SEQUENCE {
            associatedCSI-RS   NZP-CSI-RS-ResourceId
OPTIONAL, -- Cond NonCodebook
            ...
        },
        periodic               SEQUENCE {
            associatedCSI-RS   NZP-CSI-RS-ResourceId
OPTIONAL, -- Cond NonCodebook
            ...
        }
    },
    usage                      ENUMERATED {beamManagement, codebook, nonCodebook,
antennaSwitching},
```

502 → SRS-ResourceSet line
506 → OPTIONAL, -- Cond NonCodebook (aperiodic csi-RS)
504 → aperiodicSRS-ResourceTriggerList-v1530
508 → semi-persistent OPTIONAL, -- Cond NonCodebook
508 → periodic OPTIONAL, -- Cond NonCodebook

FIG. 5

FAST ADAPTATION OF TRANSMISSION PROPERTIES OF SRS RESOURCE SETS

CROSS-REFERENCE TO RELATED APPLICATIONS

This application is a continuation application of U.S. patent application Ser. No. 17/024,118, filed Sep. 17, 2020, which claims benefit of and priority to Greece Patent Application No. 20190100430, filed Oct. 3, 2019, which are hereby assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for fast adaptation of transmission properties of sounding reference signal resource sets.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved fast adaptation of transmission properties of sounding reference signal resource sets.

Certain aspects provide a method for wireless communication by a user equipment (UE). The method generally includes receiving sounding reference signal (SRS) configuration information, configuring the UE with one or more SRS resource sets, wherein each of the one or more SRS resource sets comprises one or more SRS resources; receiving signaling comprising a field indicating which of the one or more SRS resources in the one or more SRS resource sets are active and which of the one or more SRS resources in the one or more SRS resources sets are inactive; and transmitting one or more SRSs using only the one or more SRS resources that are active.

Certain aspects provide an apparatus for wireless communication by a user equipment (UE). The apparatus generally includes at least one processor configured to: receive sounding reference signal (SRS) configuration information, configuring the UE with one or more SRS resource sets, wherein each of the one or more SRS resource sets comprises one or more SRS resources; receive signaling comprising a field indicating which of the one or more SRS resources in the one or more SRS resource sets are active and which of the one or more SRS resources in the one or more SRS resources sets are inactive; and transmit one or more SRSs using only the one or more SRS resources that are active. The apparatus also generally includes a memory coupled with the at least one processor.

Certain aspects provide an apparatus for wireless communication by a user equipment (UE). The apparatus generally includes means for receiving sounding reference signal (SRS) configuration information, configuring the UE with one or more SRS resource sets, wherein each of the one or more SRS resource sets comprises one or more SRS resources; means for receiving signaling comprising a field indicating which of the one or more SRS resources in the one or more SRS resource sets are active and which of the one or more SRS resources in the one or more SRS resources sets are inactive; and means for transmitting one or more SRSs using only the one or more SRS resources that are active.

Certain aspects provide a non-transitory computer-readable medium for wireless communication by a user equipment (UE). The non-transitory computer-readable medium generally includes instructions that, when executed by at least one processor, cause at least one processor to: receive sounding reference signal (SRS) configuration information, configuring the UE with one or more SRS resource sets, wherein each of the one or more SRS resource sets comprises one or more SRS resources; receive signaling comprising a field indicating which of the one or more SRS resources in the one or more SRS resource sets are active and which of the one or more SRS resources in the one or more SRS resources sets are inactive; and transmit one or more SRSs using only the one or more SRS resources that are active.

Certain aspects provide a method for wireless communication by a base station (BS). The method generally includes transmitting sounding reference signal (SRS) configuration information to a user equipment (UE), configuring the UE with one or more SRS resource sets, wherein each of the one or more SRS resource sets comprises one or more SRS resources; transmitting signaling to the UE comprising a field indicating which of the one or more SRS resources in the one or more SRS resource sets are active and which of the one or more SRS resources in the one or more SRS resources sets are inactive; and receiving one or more SRSs from the UE on the one or more SRS resources that are active.

Certain aspects provide an apparatus for wireless communication by a base station (BS). The apparatus generally includes at least one processor configured to: transmit sounding reference signal (SRS) configuration information, configuring the UE with one or more SRS resource sets, wherein each of the one or more SRS resource sets comprises one or more SRS resources; transmit signaling comprising a field indicating which of the one or more SRS resources in the one or more SRS resource sets are active and which of the one or more SRS resources in the one or more SRS resources sets are inactive; and receive one or more SRSs from the UE on the one or more SRS resources that are active. The apparatus also generally includes a memory coupled with the at least one processor.

Certain aspects provide an apparatus for wireless communication by a base station (BS). The apparatus generally includes means for transmitting sounding reference signal (SRS) configuration information, configuring the UE with one or more SRS resource sets, wherein each of the one or more SRS resource sets comprises one or more SRS resources; means for transmitting signaling comprising a field indicating which of the one or more SRS resources in the one or more SRS resource sets are active and which of the one or more SRS resources in the one or more SRS resources sets are inactive; and means for receiving one or more SRSs from the UE on the one or more SRS resources that are active.

Certain aspects provide a non-transitory computer-readable medium for wireless communication by a base station (BS). The non-transitory computer-readable medium generally includes instructions that, when executed by at least one processor, cause at least one processor to: transmit sounding reference signal (SRS) configuration information, configuring the UE with one or more SRS resource sets, wherein each of the one or more SRS resource sets comprises one or more SRS resources; transmit signaling comprising a field indicating which of the one or more SRS resources in the one or more SRS resource sets are active and which of the one or more SRS resources in the one or more SRS resources sets are inactive; and receive one or more SRSs from the UE on the one or more SRS resources that are active.

Certain aspects provide a method for wireless communication by a user equipment (UE). The method generally includes receiving sounding reference signal (SRS) configuration information, configuring the UE with one or more SRS resource sets, wherein each of the one or more SRS resource sets comprises one or more SRS resources; receiving signaling comprising an indication of a slot offset update for a specific SRS resource set in the one or more SRS resource sets; and transmitting one or more SRSs according to the slot offset update.

Certain aspects provide an apparatus for wireless communication by a user equipment (UE). The apparatus generally includes at least one processor configured to: receive sounding reference signal (SRS) configuration information, configuring the UE with one or more SRS resource sets, wherein each of the one or more SRS resource sets comprises one or more SRS resources; receive signaling comprising an indication of a slot offset update for a specific SRS resource set in the one or more SRS resource sets; and transmit one or more SRSs according to the slot offset update. The apparatus also generally includes a memory coupled with the at least one processor.

Certain aspects provide an apparatus for wireless communication by a user equipment (UE). The apparatus generally includes means for receiving sounding reference signal (SRS) configuration information, configuring the UE with one or more SRS resource sets, wherein each of the one or more SRS resource sets comprises one or more SRS resources; means for receiving signaling comprising an indication of a slot offset update for a specific SRS resource set in the one or more SRS resource sets; and means for transmitting one or more SRSs according to the slot offset update.

Certain aspects provide a non-transitory computer-readable medium for wireless communication by a user equipment (UE). The non-transitory computer-readable medium generally includes instructions that, when executed by at least one processor, cause at least one processor to: receive sounding reference signal (SRS) configuration information, configuring the UE with one or more SRS resource sets, wherein each of the one or more SRS resource sets comprises one or more SRS resources; receive signaling comprising an indication of a slot offset update for a specific SRS resource set in the one or more SRS resource sets; and transmit one or more SRSs according to the slot offset update.

Certain aspects provide a method for wireless communication by a base station (BS). The method generally includes transmitting sounding reference signal (SRS) configuration information to a user equipment (UE), configuring the UE with one or more SRS resource sets, wherein each of the one or more SRS resource sets comprises one or more SRS resources; transmitting signaling to the UE comprising an indication of a slot offset update for a specific SRS resource set in the one or more SRS resource sets; and receiving one or more SRSs from the UE according to the slot offset update.

Certain aspects provide an apparatus for wireless communication by a base station (BS). The apparatus generally includes at least one processor configured to: transmit sounding reference signal (SRS) configuration information, configuring the UE with one or more SRS resource sets, wherein each of the one or more SRS resource sets comprises one or more SRS resources; transmit signaling to the UE comprising an indication of a slot offset update for a specific SRS resource set in the one or more SRS resource sets; and receive one or more SRSs from the UE according to the slot offset update. The apparatus also generally includes a memory coupled with the at least one processor.

Certain aspects provide an apparatus for wireless communication by a base station (BS). The apparatus generally includes means for transmitting sounding reference signal (SRS) configuration information, configuring the UE with one or more SRS resource sets, wherein each of the one or more SRS resource sets comprises one or more SRS resources; means for transmitting signaling to the UE comprising an indication of a slot offset update for a specific SRS resource set in the one or more SRS resource sets; and means for receiving one or more SRSs from the UE according to the slot offset update.

Certain aspects provide a non-transitory computer-readable medium for wireless communication by a base station (BS). The non-transitory computer-readable medium generally includes instructions that, when executed by at least one processor, cause at least one processor to: transmit sounding reference signal (SRS) configuration information, configuring the UE with one or more SRS resource sets, wherein each of the one or more SRS resource sets comprises one or more SRS resources; transmit signaling to the UE comprising an indication of a slot offset update for a specific SRS resource set in the one or more SRS resource sets; and receive one or more SRSs from the UE according to the slot offset update.

Certain aspects provide a method for wireless communication by a user equipment (UE). The method generally includes receiving sounding reference signal (SRS) configuration information, configuring the UE with one or more SRS resource sets, wherein each of the one or more SRS resource sets comprises one or more SRS resources; receiving signaling comprising an indication indicating an updated identifier (ID) of a channel state information reference signal (CSI-RS) associated with a specific SRS resource set of the one or more SRS resource sets; and transmitting one or more SRSs according to the updated ID of the CSI-RS associated with the specific SRS resource set.

Certain aspects provide an apparatus for wireless communication by a user equipment (UE). The apparatus generally includes at least one processor configured to: receive sounding reference signal (SRS) configuration information, configuring the UE with one or more SRS resource sets, wherein each of the one or more SRS resource sets comprises one or more SRS resources; receive signaling comprising an indication indicating an updated identifier (ID) of a channel state information reference signal (CSI-RS) associated with a specific SRS resource set of the one or more SRS resource sets; and transmit one or more SRSs according to the updated ID of the CSI-RS associated with the specific SRS resource set. The apparatus also generally includes a memory coupled with the at least one processor.

Certain aspects provide an apparatus for wireless communication by a user equipment (UE). The apparatus generally includes means for receiving sounding reference signal (SRS) configuration information, configuring the UE with one or more SRS resource sets, wherein each of the one or more SRS resource sets comprises one or more SRS resources; means for receiving signaling comprising an indication indicating an updated identifier (ID) of a channel state information reference signal (CSI-RS) associated with a specific SRS resource set of the one or more SRS resource sets; and means for transmitting one or more SRSs according to the updated ID of the CSI-RS associated with the specific SRS resource set.

Certain aspects provide a non-transitory computer-readable medium for wireless communication by a user equipment (UE). The non-transitory computer-readable medium generally includes instructions that, when executed by at least one processor, cause at least one processor to: receive sounding reference signal (SRS) configuration information, configuring the UE with one or more SRS resource sets, wherein each of the one or more SRS resource sets comprises one or more SRS resources; receive signaling comprising an indication indicating an updated identifier (ID) of a channel state information reference signal (CSI-RS) associated with a specific SRS resource set of the one or more SRS resource sets; and transmit one or more SRSs according to the updated ID of the CSI-RS associated with the specific SRS resource set.

Certain aspects provide a method for wireless communication by a base station (BS). The method generally includes transmitting sounding reference signal (SRS) configuration information to a user equipment (UE), configuring the UE with one or more SRS resource sets, wherein each of the one or more SRS resource sets comprises one or more SRS resources; transmitting signaling to the UE comprising an indication indicating an updated identifier (ID) of a channel state information reference signal (CSI-RS) corresponding to a specific SRS resource set of the one or more SRS resource sets; and receiving one or more SRSs from the UE according to the updated ID of the CSI-RS corresponding to the specific SRS resource set.

Certain aspects provide an apparatus for wireless communication by a base station (BS). The apparatus generally includes at least one processor configured to: transmit sounding reference signal (SRS) configuration information, configuring the UE with one or more SRS resource sets, wherein each of the one or more SRS resource sets comprises one or more SRS resources; transmit signaling to the UE comprising an indication indicating an updated identifier (ID) of a channel state information reference signal (CSI-RS) corresponding to a specific SRS resource set of the one or more SRS resource sets; and receive one or more SRSs from the UE according to the updated ID of the CSI-RS corresponding to the specific SRS resource set. The apparatus also generally includes a memory coupled with the at least one processor.

Certain aspects provide an apparatus for wireless communication by a base station (BS). The apparatus generally includes means for transmitting sounding reference signal (SRS) configuration information, configuring the UE with one or more SRS resource sets, wherein each of the one or more SRS resource sets comprises one or more SRS resources; means for transmitting signaling to the UE comprising an indication indicating an updated identifier (ID) of a channel state information reference signal (CSI-RS) corresponding to a specific SRS resource set of the one or more SRS resource sets; and means for receiving one or more SRSs from the UE according to the updated ID of the CSI-RS corresponding to the specific SRS resource set.

Certain aspects provide a non-transitory computer-readable medium for wireless communication by a base station (BS). The non-transitory computer-readable medium generally includes instructions that, when executed by at least one processor, cause at least one processor to: transmit sounding reference signal (SRS) configuration information, configuring the UE with one or more SRS resource sets, wherein each of the one or more SRS resource sets comprises one or more SRS resources; transmit signaling to the UE comprising an indication indicating an updated identifier (ID) of a channel state information reference signal (CSI-RS) corresponding to a specific SRS resource set of the one or more SRS resource sets; and receive one or more SRSs from the UE according to the updated ID of the CSI-RS corresponding to the specific SRS resource set.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 5 illustrates example sounding reference signal resource set parameters, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
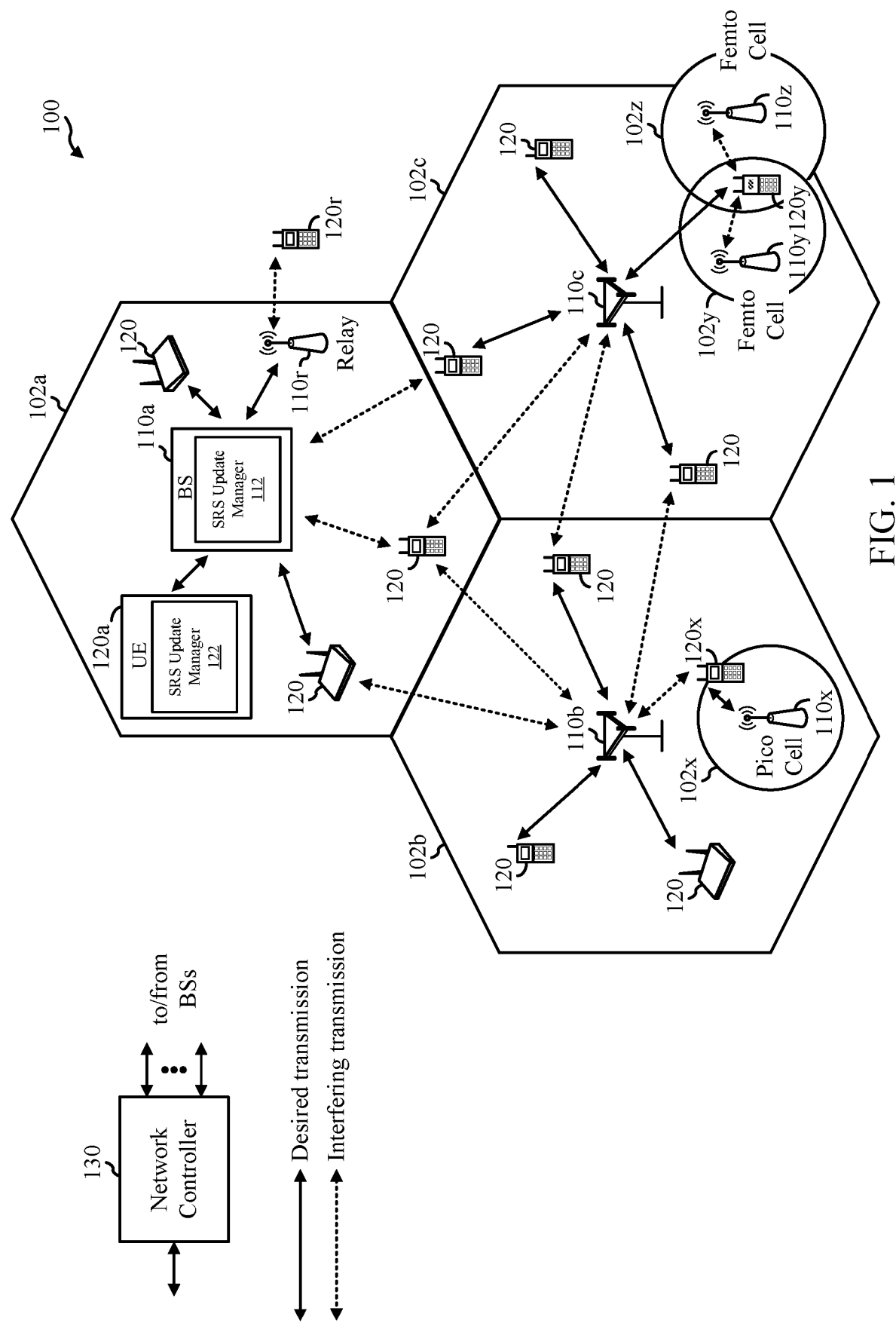
FIG. 1 is a block diagram conceptually illustrating an example telecommunications system, in accordance with certain aspects of the present disclosure.

Aspects of the present disclosure provide apparatus, methods, processing systems, and computer readable mediums for fast adaptation of transmission properties of sounding reference signal resource sets. For example, in some cases, aspects presented herein provide techniques for reducing overhead in wireless communication systems where 8-receive (Rx) SRS antenna switching is supported by one or more UEs. For example, in some cases, to reduce overhead in such wireless communications systems, aspects of the present disclosure provide techniques whereby a UE may be provided within signaling indicating one or more active SRS resources and one or more inactive SRS resources. Additionally, in some cases, the UE may be dynamically provided with one or more updated SRS parameters, such as an updated slot offset and/or updated channel state information reference signal (CSI-RS) identifier, which allows the UE to update these parameters without having to update all of its SRS configuration information.

The following description provides examples of for fast adaptation of transmission properties of sounding reference signal resource sets in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

According to certain aspects, the BSs 110 and UEs 120 may be configured for fast adaptation of transmission properties of sounding reference signal resource sets. As shown in FIG. 1, the BS 110a includes an SRS update manager 112. The SRS update manager 112 may be configured to perform the operations in FIGS. 3, 6, and 8 as well as other operations for fast adoption of transmission properties of SRS resource sets, as described herein. Additionally, as shown in FIG. 1, the UE 120a includes an SRS update manager 122. The SRS update manager 122 may be configured to perform the operations in FIGS. 4, 7, and 9, as well as other operations for fast adoption of transmission properties of SRS resource sets, as described herein.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
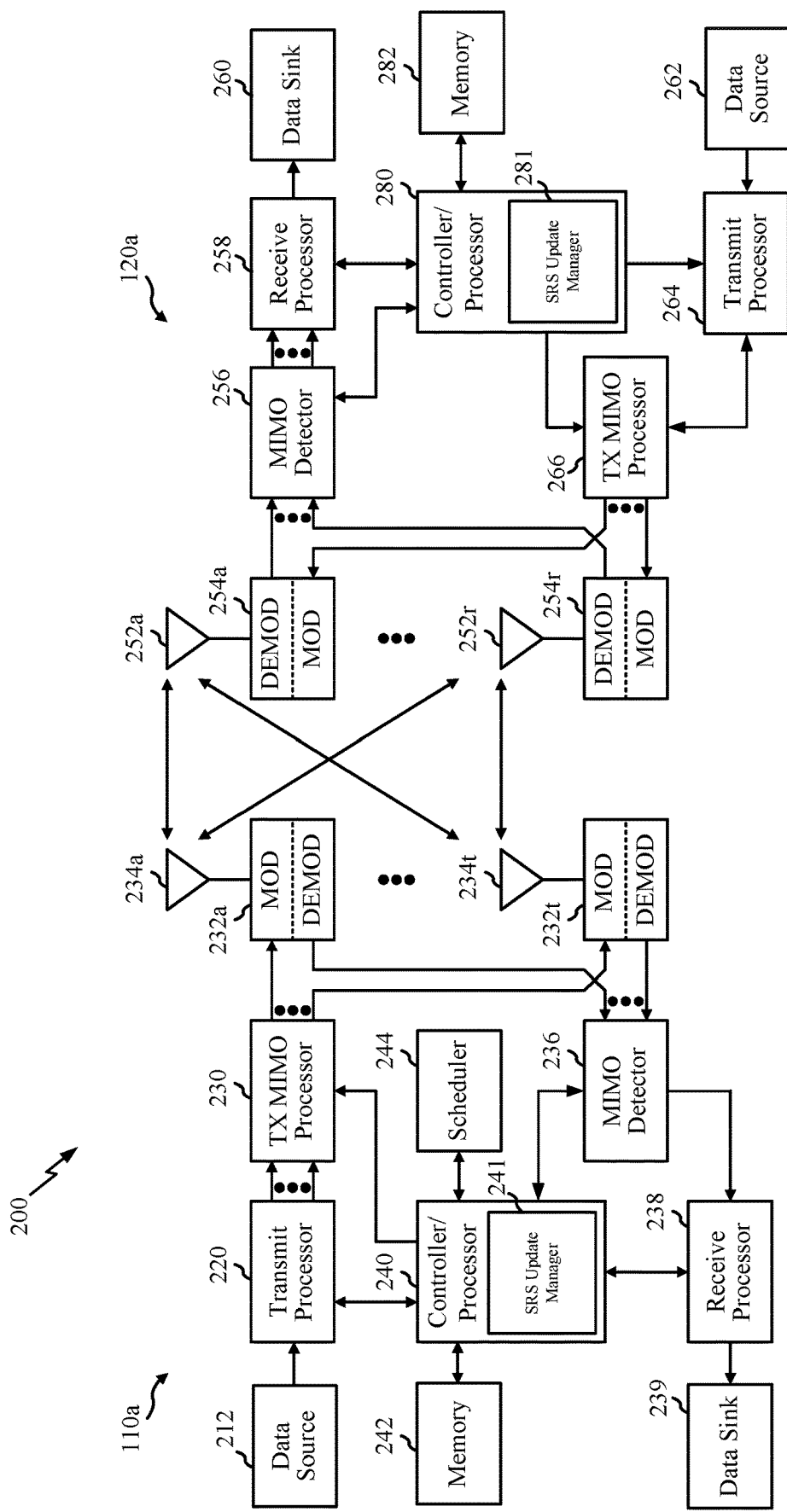
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a includes an SRS update manager 241 that may be configured for may be configured to perform the operations in FIGS. 3, 6, and 8 as well as other operations for fast adoption of transmission properties of SRS resource sets, as described herein. Additionally, as shown in FIG. 2, the controller/processor 280 of the UE 120a includes an SRS update manager 281 that may be configured to perform the operations in FIGS. 4, 7, and 9, as well as other operations for fast adoption of transmission properties of SRS resource sets, as described herein, according to aspects described herein. Although shown at the Controller/Processor, other components of the UE 120a and BS 110a may be used performing the operations described herein.

Example Fast Adaptation of Transmission Properties of SRS Resource Sets

In certain wireless communication systems, such as a time division duplex (TDD) system or an FDD system with partial or weak reciprocity, sounding is an important aspect for network performance. Accordingly, a user equipment (UE) may transmit one or more sounding reference signals (SRSs) that allow the network to estimate uplink channel quality, such as a combined effect of multipath fading, scattering, Doppler, and power loss. In some cases, the UE may include a plurality of antennas and may need to perform sounding for each antenna. However, due to certain restrictions on transmission and reception, the UE may not be able to perform sounding for each antenna at the same time. For example, in some cases, instead of being able to use all antennas for transmission and reception, the UE may only be able to use a subset of the plurality of antennas for transmission while using a different number of antennas for reception. For example, in some cases, the UE may only be able to use one transmit antenna and two receive antennas, known as 1T2R, where 1T refers to one transmit antenna T and 2R refers to two receive antennas. Other antenna configurations are possible and are explained in greater detail below.

Due to these transmission and reception restrictions, the UE may need to cycle through different transmit antennas of the plurality of antennas when transmitting SRS for sounding, known as SRS antenna switching. The main objective of SRS antenna switching is to enable downlink (DL) beamforming in TDD bands by exploiting channel reciprocity and for uplink (UL) sounding (e.g. for physical uplink shared channel (PUSCH) scheduling/beamforming). Antenna switching may be supported by wireless communications systems, such as LTE and 5G NR. In LTE Rel-15, antenna configurations 1T4R and 2T4R may be supported by the UE for SRS antenna switching. Additionally, in some cases, 5G NR may support SRS resources that span 1, 2, or 4 adjacent symbols with up to 4 antenna ports per SRS resource. Thus, in NR Rel-15, antenna configurations 1T2R, 2T4R, 1T4R, 1T4R/2T4R, or 'T=R' may be supported by the UE for SRS antenna switching.

Currently, up to 2 SRS resource sets may be configured for SRS sounding with performing antenna switching. However, as technology improves, a UE may be expected to support up to an 8-Rx antenna configuration with up to 8 SRS resources, and greater than four SRS antenna ports (e.g., to enable SRS-based DL channel state information (CSI) acquisition for 8 Rx). For example, for an 8-Rx antenna configuration, the following antenna switch schemes (e.g., as indicated by UE capability) may be added: 1T8R, 2T8R, and 4T8R. Additionally, in some cases, an SRS resource set may contain up to 8 SRS resources or more than 2 sets may be defined with a total 8 SRS resources across all the sets. However, high overhead may occur if all such SRS resources are enabled all of the time (e.g., due to the UE having to always transmit 8 SRSs), resulting in poor system performance.

Thus, aspects of the present disclosure provide techniques for reducing overhead in wireless communication systems where 8-Rx SRS antenna switching is supported by one or more UEs. For example, in some cases, reducing the overhead may involve configuring a UE with one or more SRS resource sets that each include one or more SRS resources. The UE may then be dynamically provided with signaling that provides an indication of which of the one or more SRS resources in the one or more SRS resource sets are active and which of the one or more SRS resources in the one or more SRS resources sets are inactive. The UE may then transmit one or more SRSs using only the one or more SRS resources that are active. Additionally, in some cases, the UE may be dynamically provided with one or more additional updated parameters, such as an updated slot offset information and/or CSI-RS ID information, as explained below. According to aspects, by dynamically providing the UE with updated active/inactive, slot offset, and CSI-RS ID information, the UE may quickly update its SRS configuration information by only updating these parameters without having to update all of its SRS configuration information. In other words, dynamically signaling these parameters may allow for fast adaptation of transmission properties of SRS resource sets, improving system performance, such as time/frequency/power resource usage.

Figure 3:
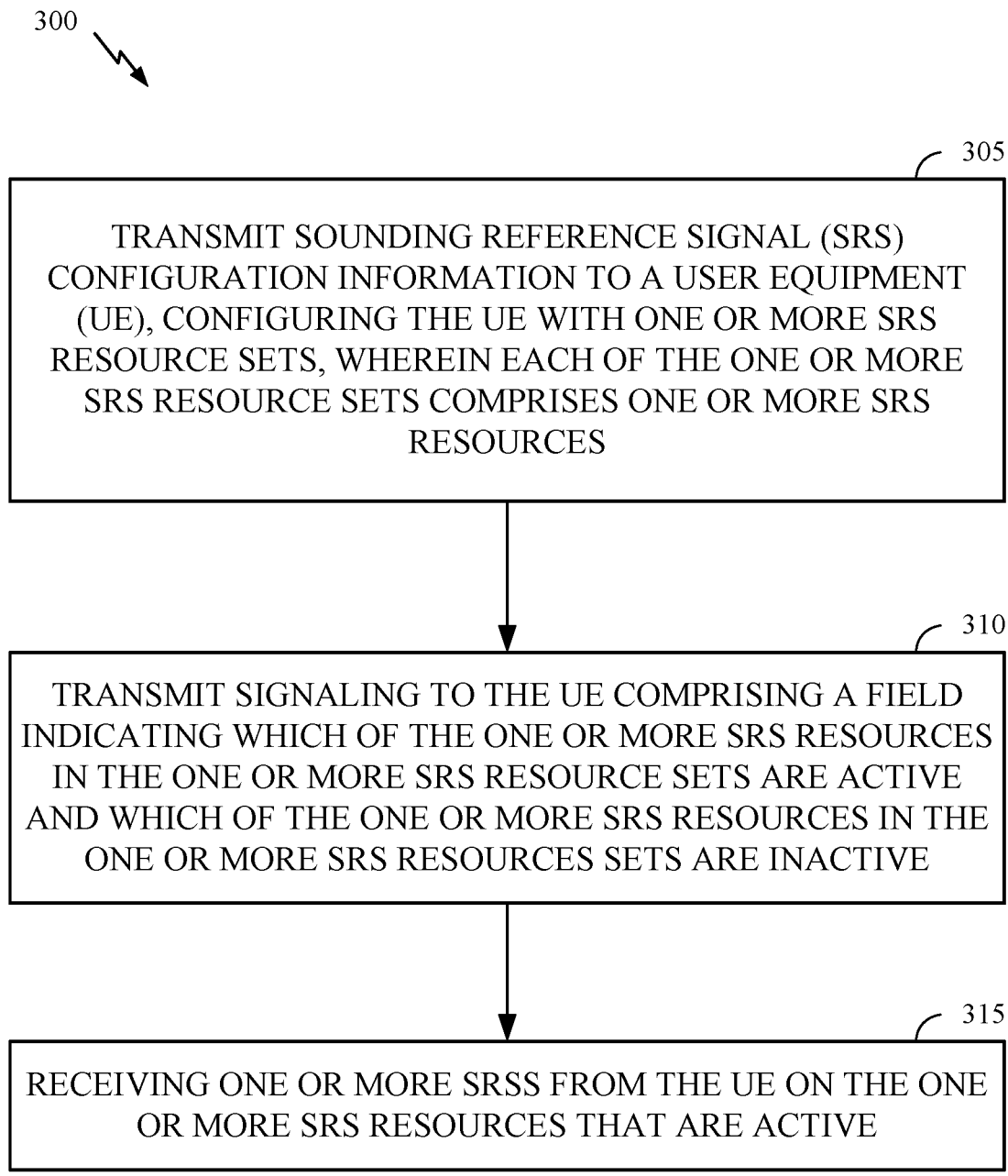
FIG. 3 is a flow diagram illustrating example operations for wireless communication by a BS, in accordance with certain aspects of the present disclosure.

FIG. 3 is a flow diagram illustrating example operations 300 for wireless communication, in accordance with certain aspects of the present disclosure. The operations X00 may be performed, for example, by a BS (e.g., such as the BS 110a in the wireless communication network 100). Operations 300 may be implemented as software components that are executed and run on one or more processors (e.g., controller/processor 240 of FIG. 2). Further, the transmission and reception of signals by the BS in operations 300 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 300 may begin, at 305, by transmitting sounding reference signal (SRS) configuration information to a user equipment (UE), configuring the UE with one or more SRS resource sets, wherein each of the one or more SRS resource sets comprises one or more SRS resources.

At 310, the BS transmits signaling to the UE comprising a field indicating which of the one or more SRS resources in the one or more SRS resource sets are active and which of the one or more SRS resources in the one or more SRS resources sets are inactive.

At 315, the BS receives one or more SRSs from the UE on the one or more SRS resources that are active.

Figure 4:
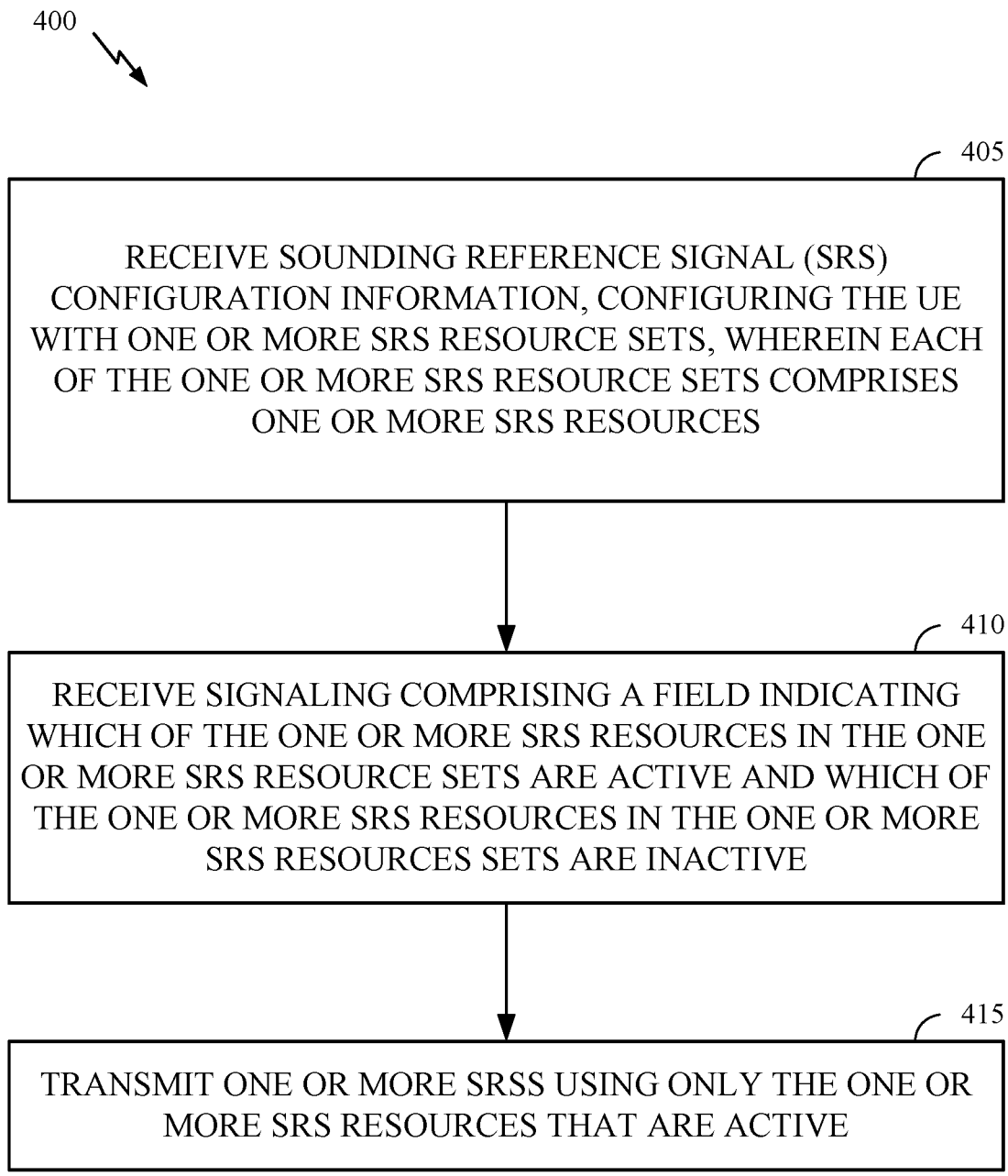
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by a UE (e.g., such as a UE 120a in the wireless communication network 100). In some cases, the UE may support 8-Rx antenna switching. The operations 400 may be complimentary operations by the UE to the operations 300 performed by the BS. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 405, by receiving sounding reference signal (SRS) configuration information, configuring the UE with one or more SRS resource sets, wherein each of the one or more SRS resource sets comprises one or more SRS resources.

At 410, the UE receives signaling comprising a field indicating which of the one or more SRS resources in the one or more SRS resource sets are active and which of the one or more SRS resources in the one or more SRS resources sets are inactive.

At 415, the UE transmits one or more SRSs using only the one or more SRS resources that are active.

As noted above, to reduce overhead associated with SRS antenna switching when a UE supports up to an 8-Rx antenna configurations, aspects of the present disclosure provide techniques whereby a UE may be provided signaling indicating which SRS resources are active and which SRS resources are inactive.

For example, as noted above, the BS may transmit sounding reference signal (SRS) configuration information to the UE, configuring the UE with one or more SRS resource sets. As noted, each of the one or more SRS resource sets may comprise one or more SRS resources. According to aspects, an SRS resource may be a collection of consecutive orthogonal frequency division multiplexing (OFDM) symbols within a slot as well as consecutive physical resource blocks (PRBs) in the frequency domain where the UE is configured to transmit SRS.

In some cases, the UE may support up to 8-Rx SRS antenna switching. Accordingly, in such a case, the one or more SRS resource sets may include up to eight SRS resource sets that may be used for the purpose of antenna switching or codebook-based UL transmission or non-codebook-based UL transmission, or a combination thereof. Additionally, in some cases, the one or more SRS resources sets may comprise up to eight or more SRS resources for transmitting SRSs. In this case, one SRS resource set may contain up to 8 SRS resources, or 2 or more SRS resource sets may be defined with a total 8 SRS resources across all the sets.

According to aspects, as the UE may not need to transmit SRSs in all of the SRS resources all of the time, the BS may transmit signaling to the UE comprising a field indicating which of the one or more SRS resources in the one or more SRS resource sets are active and which of the one or more SRS resources in the one or more SRS resources sets are inactive. In some cases, the signaling may be transmitted/received dynamically whenever the active/inactive SRS resources need to be updated without having to update other SRS resource set parameters. Dynamically updating the active/inactive SRS resources may reduce overhead in the wireless communication system since not all SRS resource set parameters may need to be updated, such as the number of symbols (N_symb), T_PRS, slot-offset, frequency hopping parameters, scrambling ID of SRS resources, and the like. Accordingly, upon receiving the signaling, the UE may then transmit one or more SRSs using only the one or more SRS resources that are active, reducing overhead in the system.

In some cases, the signaling may apply to periodic SRS resources sets, semi-persistent SRS resources sets, and/or aperiodic SRS resources sets. Additionally, in some cases, the signaling may be received when a number of the one or more SRS resources within the one or more SRS resource sets, or across all the SRS resource sets, is above a threshold. For example, in some cases, if the number of the one or more SRS resources configured for the UE is above, for example, four SRS resources, the BS may transmit the signaling to the UE, indicating which of the SRS resources are active and which are inactive. It should be noted that the threshold may be any number and should not be construed as being limited to four.

Additionally, in some cases, the signaling may comprise a media access control control element (MAC CE) and the field in the signaling may comprise an N-bit field in the MAC CE, wherein N comprises a number of the of the one or more SRS resources in the one or more SRS resource sets. For example, if the one or more SRS resources comprises eight SRS resources, then the N-bit field may comprise eight bits. According to aspects, each bit in the N-bit field correspond to a different SRS resource in the one or more SRS resources, indicating whether that SRS resource is active or inactive.

In some cases, the one or more resource sets may comprise one or more aperiodic SRS resource sets. In this case, the signaling transmitted by the BS may provide the indication of which of the one or more SRS resources in the one or more SRS resource sets are active and which of the one or more SRS resources in the one or more SRS resources sets are inactive for one or more downlink control information (DCI) code points. For example, as illustrated in FIG. 5, SRS configuration information may include the parameter "aperiodicSRS-ResourceTrigger" as illustrated at 502, which indicates the DCI "code point" upon which the UE shall transmit SRS according to this SRS resource set configuration (see TS 38.214, section 6.1.1.2). Additionally, the SRS configuration information may include the parameter "aperiodicSRS-ResourceTriggerList" as illustrated at 504, which provides an additional list of DCI "code points" upon which the UE may transmit SRS according to this SRS resource set configuration (see TS 38.214, section 6.1.1.2).

Thus, in some cases, as noted, the signaling may include the indication of which of the one or more SRS resources in the one or more SRS resource sets are active and which of the one or more SRS resources in the one or more SRS resources sets are inactive for one or more downlink control information (DCI) code points. For example, in some cases, if an aperiodic SRS resource set with 4 SRS resources can be triggered with code point 01 and 10, then the signaling (e.g., MAC CE) may indicate that for code point 01, SRS resources 0 and 2 are switched ON (e.g., active), whereas for code point 10, SRS resources 1 and 3 are switched ON (e.g., active). Accordingly, the UE may transmit one or more SRSs according to the active SRS resources for the associated code points.

In some cases, for aperiodic SRS resources sets, the BS may transmit an indication to the UE of an updated parameters, such as a slot offset update for a specific SRS resource set in the one or more aperiodic SRS resource sets, which may update a slot offset received in the SRS configuration information of FIG. 5 as illustrated at 506. According to aspects, the slot offset update may be transmitted/updated dynamically and may indicate an offset in a number of slots between a triggering of downlink control information (DCI) and transmission of one or more SRSs corresponding to the specific SRS resource set. In some cases, the indication of the slot offset update may be received in the signaling, which may comprise a MAC-CE, as noted above. In some cases, the slot offset update may only apply to a specific SRS resource set but not to other SRS resources sets of the one or more SRS resource sets. For example, in some cases, the signaling may further include an indication to which SRS resource sets to which the indicated slot offset applies. In this case, the UE may update the slot offset for the specific SRS resource set without updating other SRS resource set parameters.

According to aspects, for scenarios including an SRS resource set with a large number of SRS resources, such a dynamic update of the slot offset may enable better multiplexing of the SRS resource set with other UL channels and a variety of slot formats and dynamic slot format changes. In some cases, the dynamic slot offset may be enabled only for a specific usage, like SRS for antenna switching and, in some cases, only if the set has a large number of SRS resources.

Additionally, in some cases, the BS may further transmit an indication to the UE indicating another updated parameter, such as an updated identifier (ID) of a channel state information reference signal (CSI-RS) associated with a specific SRS resource set of the one or more SRS resource sets. According to aspects, the CSI-RS resource associated with the CSI-RS ID may be received by the UE and processed for the purpose of deriving a transmit precoder for the SRS resources of the associated SRS resource set. In some cases, the updated ID of the CSI-RS may be transmitted to the UE using a parameter known as "associatedCSI-RS," which may contain an ID of CSI-RS resource associated with this SRS resource set in non-codebook based operation and may update the "associatedCSI-RS" parameter received previously in the SRS configuration information of FIG. 5 illustrated at 508. Additionally, in some cases, this association (e.g., CSI-RS associated with a specific SRS resource set) can be used for CSI-RS-driven beamformed SRS transmissions to enable better throughput and beamforming on the downlink.

According to aspects, upon receiving the indication of the updated ID, the UE may update the ID of the CSI-RS associated with the specific SRS resource set, for example, without updating other SRS resource set parameters. For example, in some cases, the UE may receive dynamic signaling indicating an update to the ID of the CSI-RS. The update may allow the UE to update only the ID of the CSI-RS (e.g., "associatedCSI-RS") without having to update other SRS resource set parameters (e.g., N_symb, T_PRS, slot-offset, frequency hopping parameters, scrambling ID of SRS resources, and the like). Additionally, in some cases, the indication of the updated ID of the CSI-RS may be received in the signaling, which may comprise a MAC-CE.

As noted above, in some cases, the BS may dynamically transmit signaling indicating a slot offset update for a specific SRS resource set in the one or more aperiodic SRS resource sets. While the slot offset update is described above in relation to also receiving an indication of which SRS resources are active and which SRS resources are inactive, aspects of the present disclosure provide techniques whereby a UE may receive the slot offset update independent of the indications regarding the active/inactive SRS resources.

Figure 6:
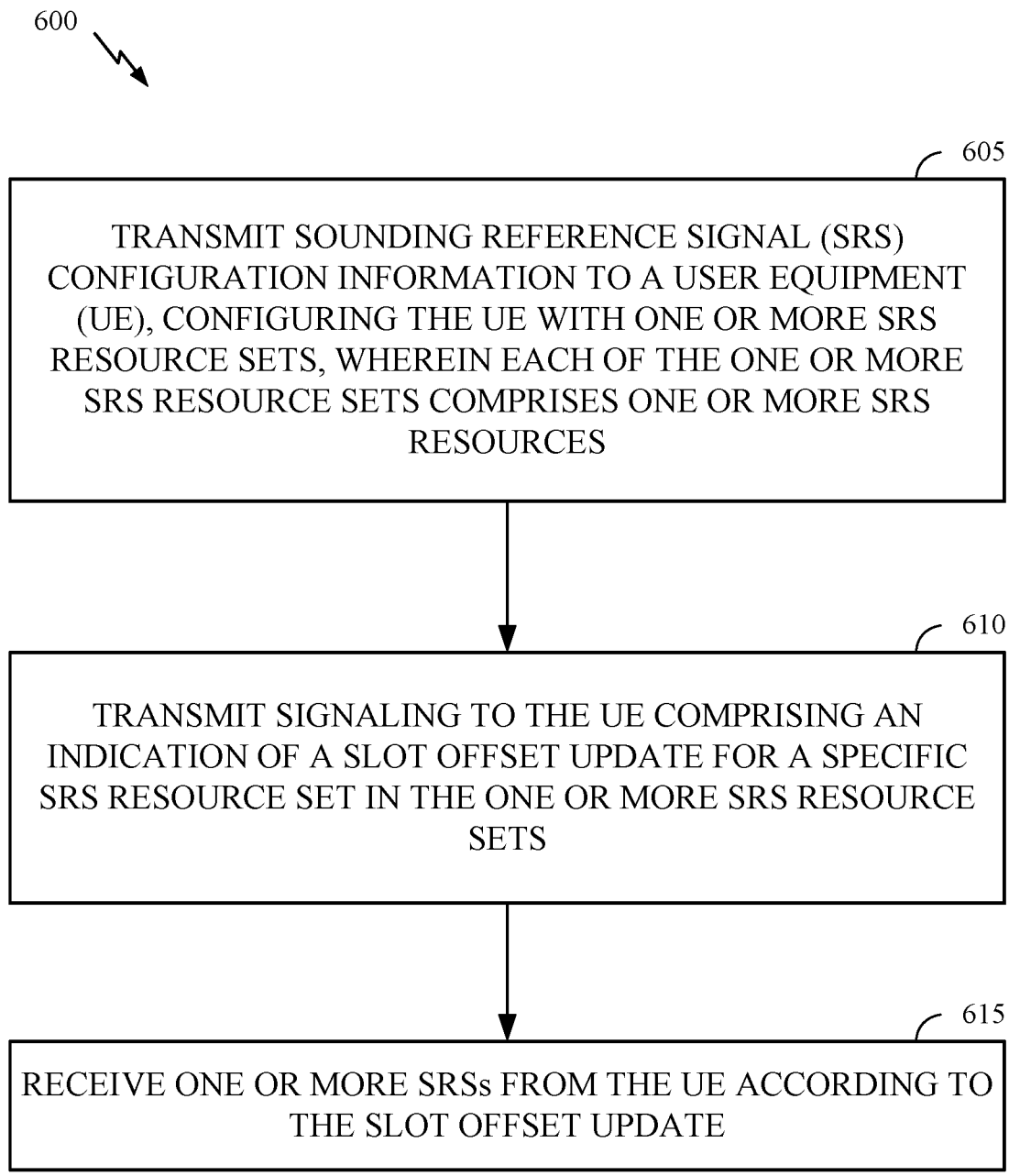
FIG. 6 is a flow diagram illustrating example operations for wireless communication by a BS, in accordance with certain aspects of the present disclosure.

For example, FIG. 6 is a flow diagram illustrating example operations 600 for wireless communication, for example, for dynamically updating a slot offset, in accordance with certain aspects of the present disclosure. The operations 600 may be performed, for example, by a BS (e.g., such as the BS 110a in the wireless communication network 100). Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 605, by transmitting sounding reference signal (SRS) configuration information to a user equipment (UE), configuring the UE with one or more SRS resource sets, wherein each of the one or more SRS resource sets comprises one or more SRS resources.

At 610, the BS transmits signaling to the UE comprising an indication of a slot offset update for a specific SRS resource set in the one or more SRS resource sets.

At 615, the BS receives one or more SRSs from the UE according to the slot offset update.

Figure 7:
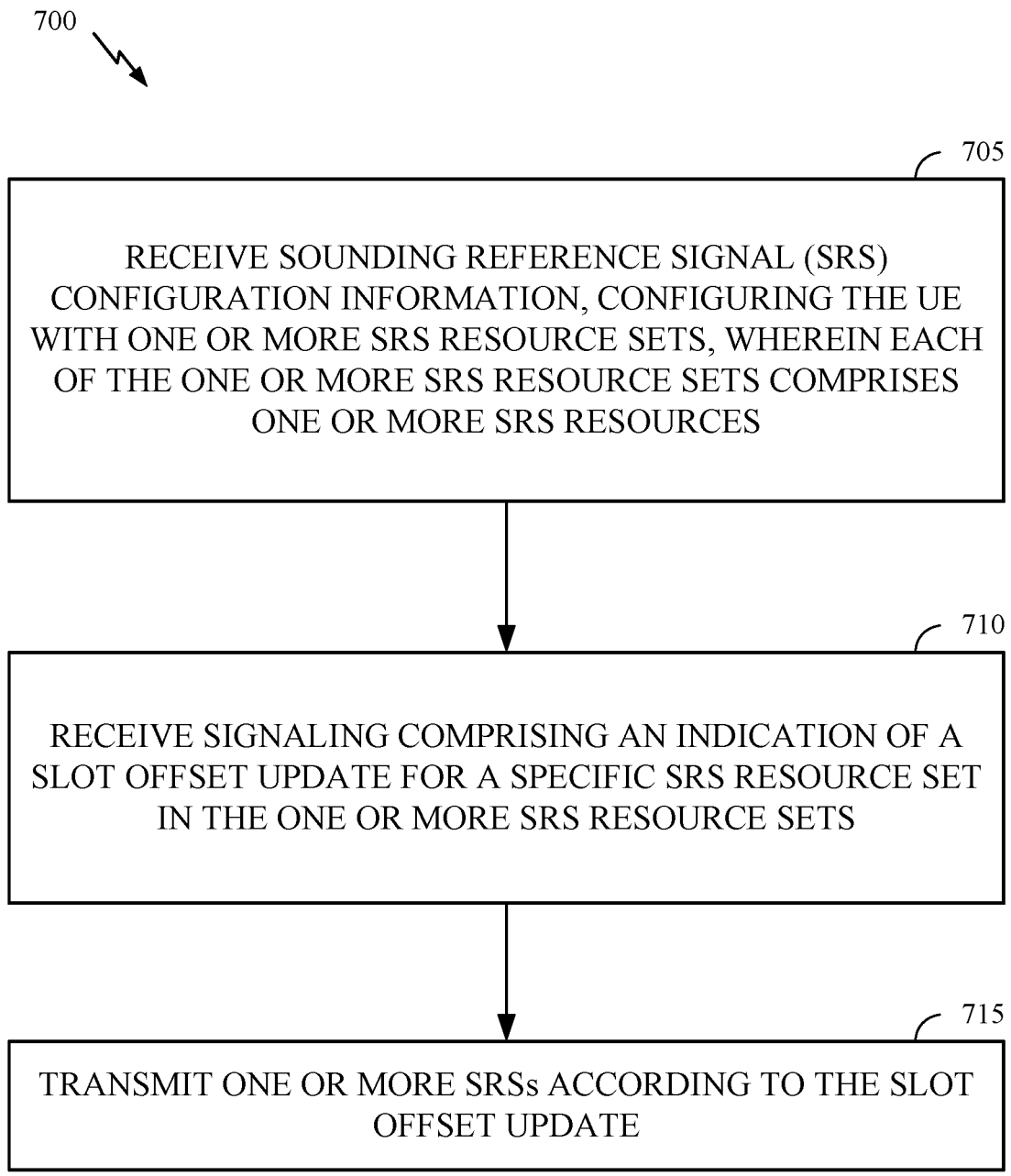
FIG. 7 is a flow diagram illustrating example operations for wireless communication by a UE, in accordance with certain aspects of the present disclosure.

FIG. 7 is a flow diagram illustrating example operations 700 for wireless communication, for example, for dynamically updating a slot offset, in accordance with certain aspects of the present disclosure. The operations 700 may be performed, for example, by a UE (e.g., such as a UE 120a in the wireless communication network 100). The operations 700 may be complimentary operations by the UE to the operations 700 performed by the BS. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at 705, by receiving sounding reference signal (SRS) configuration information, configuring the UE with one or more SRS resource sets, wherein each of the one or more SRS resource sets comprises one or more SRS resources.

At 710, the UE receives signaling comprising an indication of a slot offset update for a specific SRS resource set in the one or more SRS resource sets.

At 715, the UE transmits one or more SRSs according to the slot offset update.

According to aspects, as noted above, the signaling may comprise a MAC CE. In some cases, the signaling may apply to periodic, semi-persistent, and/or aperiodic SRSs for SRS resource sets using antenna switching. Additionally, according to aspects, the one or more SRS resource sets may comprise one or more aperiodic SRS resource sets. Further, in some cases, the slot offset update may indicate an offset in a number of slots between a triggering of downlink control information (DCI) and transmission of one or more SRSs corresponding to the specific SRS resource set. Further, in some cases, since the slot offset signaling may be transmitted dynamically, the slot offset update may only apply to the specific SRS resource set but may not apply to other SRS resources sets of the one or more SRS resource sets. Thus, in this case, the UE may update the slot offset for the specific SRS resource set without updating other SRS resource set parameters.

Additionally, as noted above, in some cases, the BS may dynamically transmit signaling indicating an updated identifier (ID) of a channel state information reference signal (CSI-RS) associated with a specific SRS resource set of the one or more SRS resource sets. While the updated CSI-RS ID is described above in relation to also receiving an indication of which SRS resources are active and which SRS resources are inactive, aspects of the present disclosure provide techniques whereby a UE may receive the update CSI-RS ID independent of the indications regarding the active/inactive SRS resources.

Figure 8:
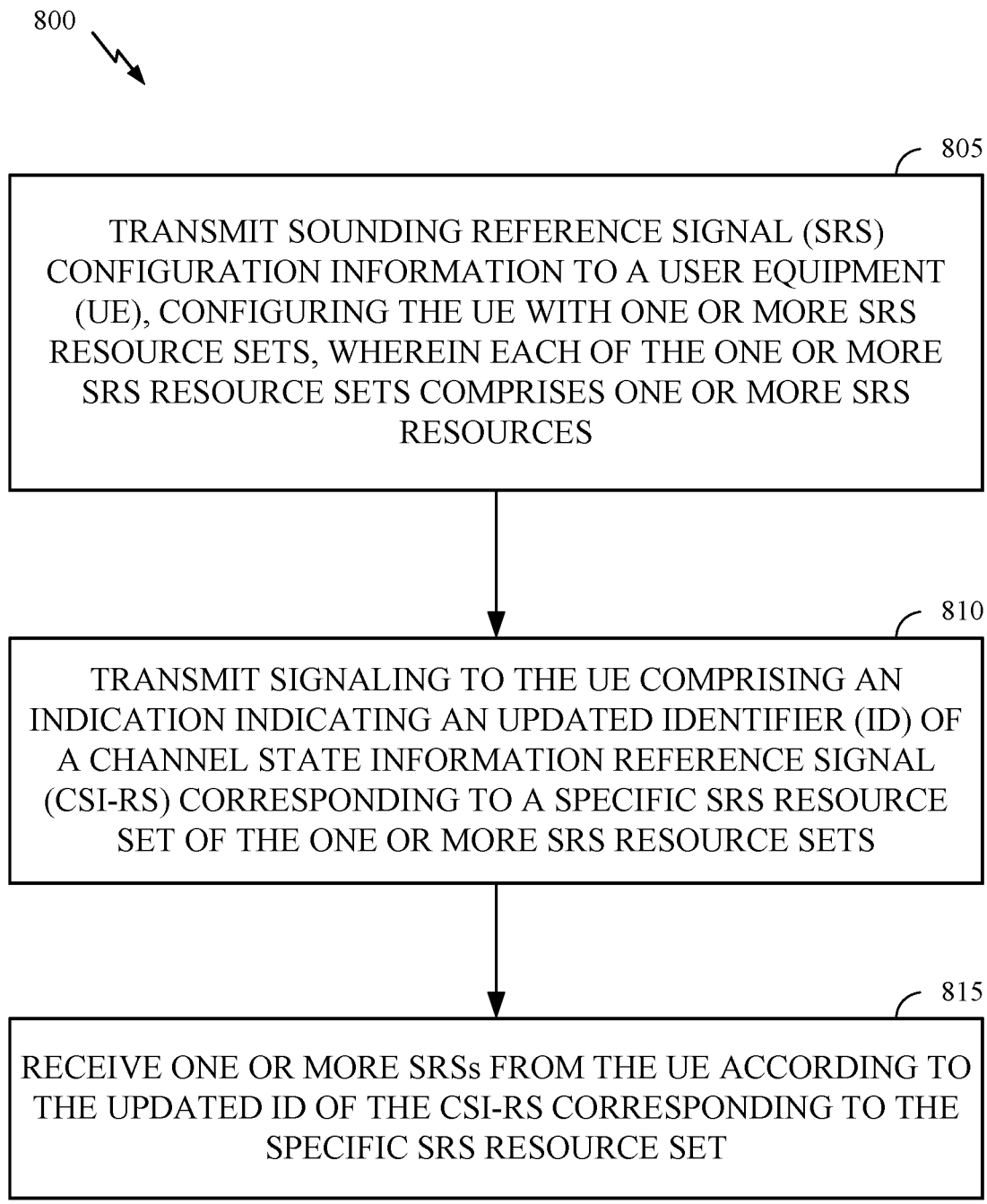
FIG. 8 is a flow diagram illustrating example operations for wireless communication by a BS, in accordance with certain aspects of the present disclosure.

For example, FIG. 8 is a flow diagram illustrating example operations 800 for wireless communication, for example, for dynamically updating an ID of a CSI-RS associated with a specific SRS resource set, in accordance with certain aspects of the present disclosure. The operations 800 may be performed, for example, by a BS (e.g., such as the BS 110a in the wireless communication network 100). Operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 may begin, at 805, by transmitting sounding reference signal (SRS) configuration information to a user equipment (UE), configuring the UE with one or more SRS resource sets, wherein each of the one or more SRS resource sets comprises one or more SRS resources.

At 810, the BS transmits signaling to the UE comprising an indication indicating an updated identifier (ID) of a channel state information reference signal (CSI-RS) corresponding to a specific SRS resource set of the one or more SRS resource sets.

At 815, the BS receives one or more SRSs from the UE according to the updated ID of the CSI-RS corresponding to the specific SRS resource set.

Figure 9:
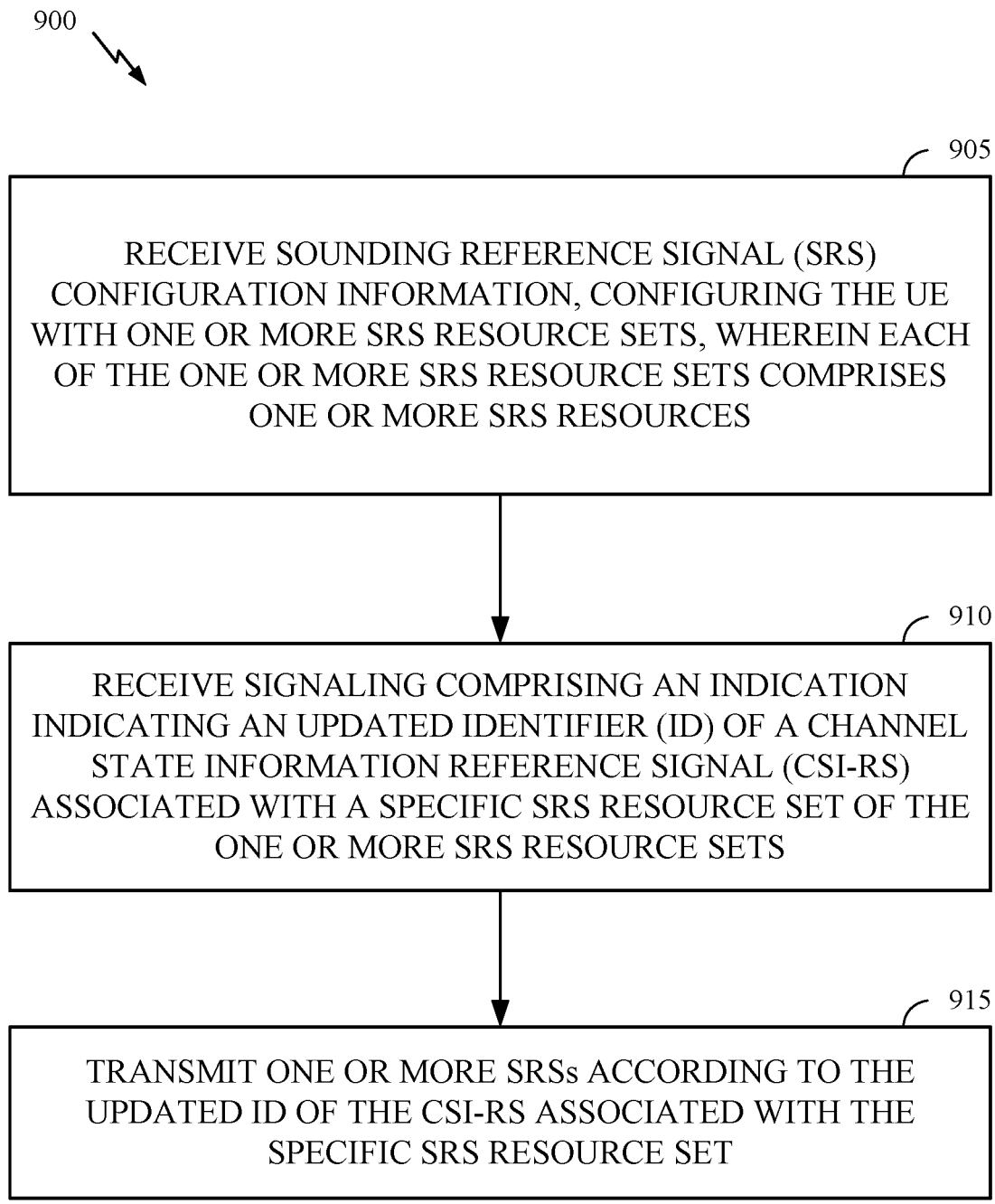
FIG. 9 is a flow diagram illustrating example operations for wireless communication by a UE, in accordance with certain aspects of the present disclosure.

FIG. 9 is a flow diagram illustrating example operations 900 for wireless communication, for example, for dynamically updating an ID of a CSI-RS associated with a specific SRS resource set, in accordance with certain aspects of the present disclosure. The operations 900 may be performed, for example, by a UE (e.g., such as a UE 120a in the wireless communication network 100). The operations 800 may be complimentary operations by the UE to the operations 800 performed by the BS. Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at 905, by receiving sounding reference signal (SRS) configuration information, configuring the UE with one or more SRS resource sets, wherein each of the one or more SRS resource sets comprises one or more SRS resources.

At 910, the UE receives signaling comprising an indication indicating an updated identifier (ID) of a channel state information reference signal (CSI-RS) associated with a specific SRS resource set of the one or more SRS resource sets.

At 915, the UE transmits one or more SRSs according to the updated ID of the CSI-RS associated with the specific SRS resource set.

As noted above, the signaling may be dynamically transmitted/received in a MAC CE. In some cases, the signaling may apply to periodic, semi-persistent, and/or aperiodic SRSs for SRS resource sets using antenna switching. Additionally, in some cases, based on the updated CSI-RS ID received in the signaling, the UE may update the ID of the CSI-RS corresponding to the specific SRS resource set without updating other SRS resource set parameters. The UE may then transmit the one or more SRSs based, at least in part, on the updated CSI-RS ID.

Figure 10:
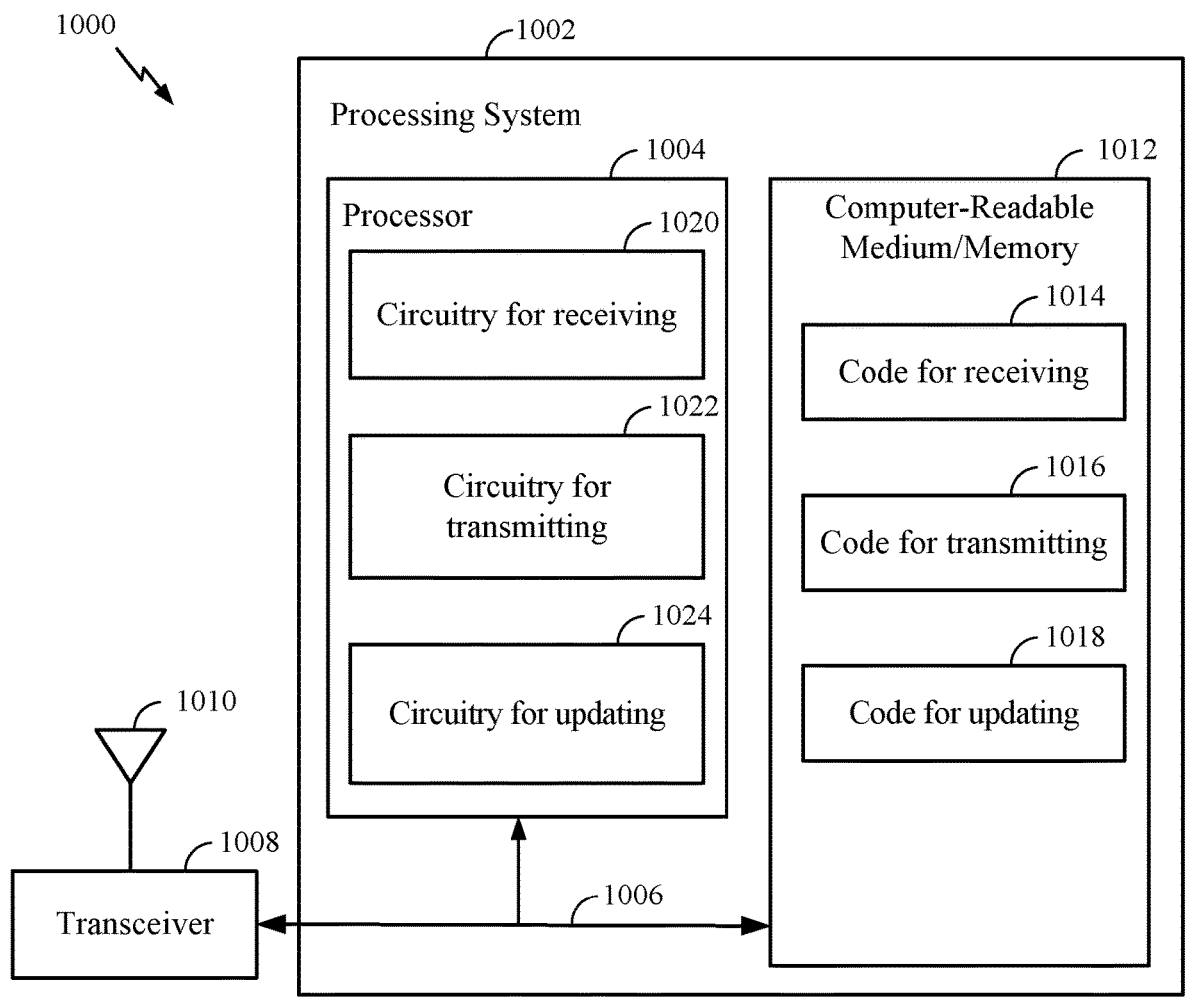
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIGS. 4, 7, and 9. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 4, 7, and/or 9, or other operations for performing the various techniques discussed herein for fast adaptation of transmission properties of SRS resource sets. In certain aspects, computer-readable medium/memory 1012 stores code 1014 for receiving; code 1016 for transmitting; and code 1018 for updating. In certain aspects, the processor 1004 includes circuitry configured to implement the code stored in the computer-readable medium/memory 1012. For example, the processor 1004 includes circuitry 1020 for receiving; circuitry 1022 for transmitting; and code 1024 for updating.

Figure 11:
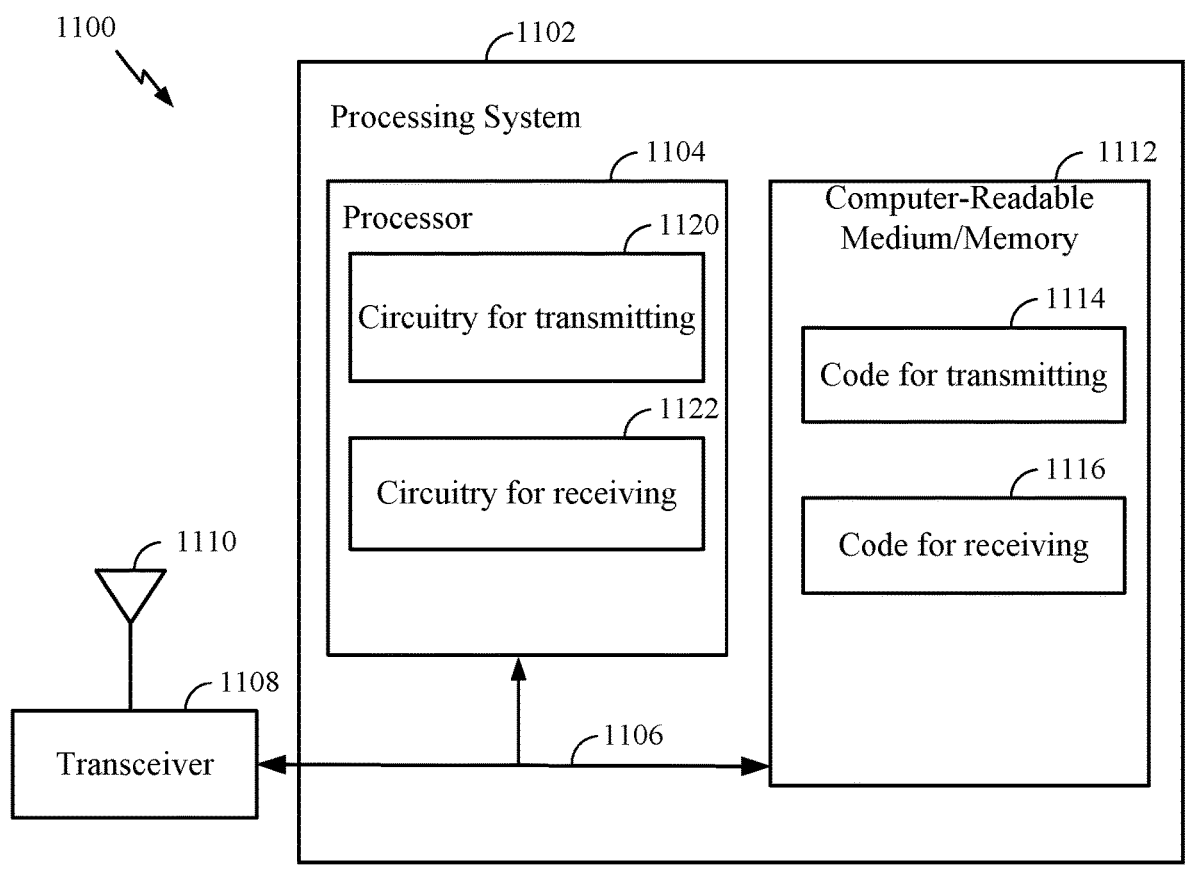
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 3, 6, and/or 8. The communications device 1100 includes a processing system 1002 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 3, 6, and/or 8, or other operations for performing the various techniques discussed herein for fast adaptation of transmission properties of SRS resource sets. In certain aspects, computer-readable medium/memory 1112 stores code 1114 for transmitting and code 1116 for receiving. In certain aspects, the processor 1104 includes circuitry configured to implement the code stored in the computer-readable medium/memory 1112. For example, the processor 1104 includes circuitry 1120 for receiving and circuitry 1122 for transmitting.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3, 4, 6, 7, 8, and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
receiving sounding reference signal (SRS) configuration information, configuring the UE with one or more SRS resource sets, wherein each of the one or more SRS resource sets comprises a plurality of SRS resources;
receiving signaling comprising a media access control-control element (MAC-CE), wherein the signaling applies to semi-persistent SRS resources sets and wherein the signaling is received when a number of SRS resources within the one or more SRS resource sets, or across all the SRS resource sets, is above a threshold; and
the signaling includes:
a field that indicates activation information or inactivation information for the one or more SRS resource sets; and
an indication including updated identifier (ID) of a channel state information reference signal (CSI-RS) associated with a specific SRS resource set of the one or more SRS resource sets, wherein the indication does not include updates for one or more other SRS resource set parameters; and
transmitting one or more SRSs in the one or more SRS resource sets based on the field that indicates the activation information or the inactivation information for the one or more SRS resource sets.

2. The method of claim 1, wherein the field comprises an N-bit field in the MAC-CE, wherein N comprises a number of the SRS resources of the plurality of SRS resources in the one or more SRS resource sets.

3. The method of claim 1, wherein the one or more SRS resource sets comprise one or more aperiodic SRS resource sets.

4. The method of claim 3, wherein the signaling provides the indication of which of the SRS resources of the plurality of SRS resources in the one or more SRS resource sets are active and which of the SRS resources of the plurality of SRS resources in the one or more SRS resources sets are inactive for one or more downlink control information (DCI) codepoints.

5. The method of claim 3, further comprising receiving, in the signaling, an indication of a slot offset update for a specific SRS resource set in the one or more aperiodic SRS resource sets, wherein the slot offset update indicates an offset in a number of slots between a triggering of downlink control information (DCI) and transmission of one or more SRSs corresponding to the specific SRS resource set.

6. The method of claim 5, wherein:
the slot offset update only applies to the specific SRS resource set but not to other SRS resources sets of the one or more SRS resource sets.

7. The method of claim 5, further comprising updating, based on the slot offset update, a slot offset for the specific SRS resource set without updating the one or more other SRS resource set parameters.

8. The method of claim 1, wherein the one or more other SRS resource set parameters comprise at least one of a number of symbols, a slot offset, frequency hopping parameters, or a scrambling ID of SRS resources.

9. The method of claim 1, further comprising:
receiving the CSI-RS based, at least in part on the updated ID of the CSI-RS; and
using the CSI-RS to derive a transmit precoder for SRS resources of the plurality of the SRS resources in the specific SRS resource set, wherein the one or more SRS resource sets are configured to be used for at least one of antenna switching, codebook-based UL transmission, or non-codebook-based UL transmission, or a combination thereof.

10. A method for wireless communication by a user equipment (UE), comprising:
receiving sounding reference signal (SRS) configuration information, configuring the UE with one or more SRS resource sets, wherein each of the one or more SRS resource sets comprises a plurality of SRS resources;
receiving signaling comprising a media access control-control element (MAC-CE) including an indication of one or more updated parameters for a specific SRS resource set in the one or more SRS resource sets, wherein the signaling applies to semi-persistent SRS resources sets and wherein the signaling is received when a number of SRS resources within the one or more SRS resource sets, or across all the SRS resource sets, is above a threshold;
the one or more updated parameters comprise an updated identifier (ID) of a channel state information reference signal (CSI-RS) for the specific SRS resource set of the one or more SRS resource sets; and
the MAC-CE does not include updates for one or more other SRS resource set parameters; and
updating the ID of the CSI-RS associated with the specific SRS resource set; and
transmitting one or more SRSs according to the one or more updated parameters.

11. The method of claim 10, wherein:
the one or more updated parameters further comprise a slot offset update for the specific SRS resource set in the one or more SRS resource sets;
the one or more SRS resource sets comprise one or more aperiodic SRS resource sets; and
the slot offset update indicates an offset in a number of slots between a triggering of downlink control information (DCI) and transmission of one or more SRSs corresponding to the specific SRS resource set.

12. The method of claim 11, wherein the slot offset update only applies to the specific SRS resource set but not to other SRS resources sets of the one or more SRS resource sets.

13. The method of claim 11, further comprising updating, based on the slot offset update, a slot offset for the specific SRS resource set without updating the one or more other SRS resource set parameters.

14. The method of claim 10, wherein the one or more other SRS resource set parameters comprise at least one of a number of symbols, a slot offset, frequency hopping parameters, or a scrambling ID of SRS resources.

15. A method for wireless communication by a base station (BS), comprising:
transmitting sounding reference signal (SRS) configuration information to a user equipment (UE), configuring the UE with one or more SRS resource sets, wherein each of the one or more SRS resource sets comprises a plurality of SRS resources;
transmitting signaling to the UE comprising a media access control-control element (MAC-CE), wherein:
the signaling applies to semi-persistent SRS resources sets; and
the signaling includes:
a field that indicates activation information or inactivation information for the one or more SRS resource sets, wherein the field comprises an N-bit field in the MAC-CE, wherein N comprises a number of the SRS resources of the plurality of SRS resources in the one or more SRS resource sets; and
an indication including updated identifier (ID) of a channel state information reference signal (CSI-RS) associated with a specific SRS resource set of the one or more SRS resource sets, wherein the indication does not include updates for one or more other SRS resource set parameters; and
receiving one or more SRSs from the UE on SRS resources of the plurality of SRS resources that are indicated as active.

16. The method of claim 15, wherein the signaling is transmitted when a number of SRS resources within one or more SRS resource sets, or across all the SRS resource sets, is above a threshold.

17. The method of claim 15, wherein the one or more SRS resource sets comprise one or more aperiodic SRS resource sets.

18. The method of claim 17, wherein the signaling provides the indication of which of the SRS resources of the plurality of SRS resources in the one or more SRS resource sets are active and which of the SRS resources of the plurality of SRS resources in the one or more SRS resources sets are inactive for one or more downlink control information (DCI) codepoints.

19. The method of claim 17, further comprising transmitting, in the signaling, an indication of a slot offset update for a specific SRS resource set in the one or more aperiodic SRS resource sets, wherein the slot offset update indicates an offset in a number of slots between a triggering of downlink control information (DCI) and transmission of one or more SRSs corresponding to the specific SRS resource set.

20. The method of claim 19, wherein the slot offset update only applies to the specific SRS resource set but not to other SRS resources sets of the one or more SRS resource sets.

21. The method of claim 15, wherein the one or more other SRS resource set parameters comprise at least one of a number of symbols, a slot offset, frequency hopping parameters, or a scrambling ID of SRS resources.

22. A method for wireless communication by a base station (BS), comprising:
transmitting sounding reference signal (SRS) configuration information to a user equipment (UE), configuring the UE with one or more SRS resource sets, wherein each of the one or more SRS resource sets comprises a plurality of SRS resources;
transmitting signaling to the UE comprising a media access control-control element (MAC-CE) including an indication of one or more updated parameters for a specific SRS resource set in the one or more SRS resource sets, wherein:
the signaling applies to semi-persistent SRS resources sets and the signaling is transmitted when a number of SRS resources within one or more SRS resource sets, or across all the SRS resource sets, is above a threshold;
the one or more updated parameters comprise an updated identifier (ID) of a channel state information reference signal (CSI-RS) for the specific SRS resource set of the one or more SRS resource sets; and the MAC-CE does not include updates for one or more other SRS resource set parameters; and receiving one or more SRSs from the UE according to the one or more updated parameters.

23. The method of claim 22, wherein:

the one or more updated parameters further comprise a slot offset update for the specific SRS resource set in the one or more SRS resource sets;

the one or more SRS resource sets comprise one or more aperiodic SRS resource sets;

the slot offset update indicates an offset in a number of slots between a triggering of downlink control information (DCI) and transmission of one or more SRSs corresponding to the specific SRS resource set; and the slot offset update only applies to the specific SRS resource set but not to other SRS resources sets of the one or more SRS resource sets.

24. The method of claim 22, wherein the one or more other SRS resource set parameters comprise at least one of a number of symbols, a slot offset, frequency hopping parameters, or a scrambling ID of SRS resources.

* * * * *